United States Patent [19]

Bankston

[11] Patent Number: 4,544,364
[45] Date of Patent: Oct. 1, 1985

[54] ILLUMINATED BUOY MARKER

[76] Inventor: Patrick D. Bankston, 24 Duncan Dr., Buford, Ga. 30518

[21] Appl. No.: 578,821

[22] Filed: Feb. 10, 1984

[51] Int. Cl.⁴ ............................................. B63B 21/52
[52] U.S. Cl. ......................................... 441/6; 441/16; 441/26; 441/28
[58] Field of Search .................... 441/6, 13, 16, 26, 28

[56] References Cited

U.S. PATENT DOCUMENTS 2,977,608  4/1961  Brown, Sr. et al. .................... 441/6
4,405,303  9/1983  Smith .................................... 441/16

Primary Examiner—Sherman D. Basinger
Attorney, Agent, or Firm—Jones & Askew

[57] ABSTRACT

The present invention is a self-setting, illuminated buoy marker for anglers, made of a translucent material which is elongated in shape and has a bifurcated body of two end members connected to a narrow waist stem member. The marker has a lighting device inside of the buoy marker, which may be illuminated for night fishing and gives off a soft illumination which is only visible for limited distances so as not to spook the fish or to give away the angler's precise position. Attached to the buoy marker is an anchor line and an anchor assembly which unwinds and sets the buoy in a precise location that the angler selects and maintains the buoy in that position. When the buoy is in an operative position it is visible to the angler from any direction in both daylight and darkness, regardless of wind or wave conditions.

8 Claims, 6 Drawing Figures

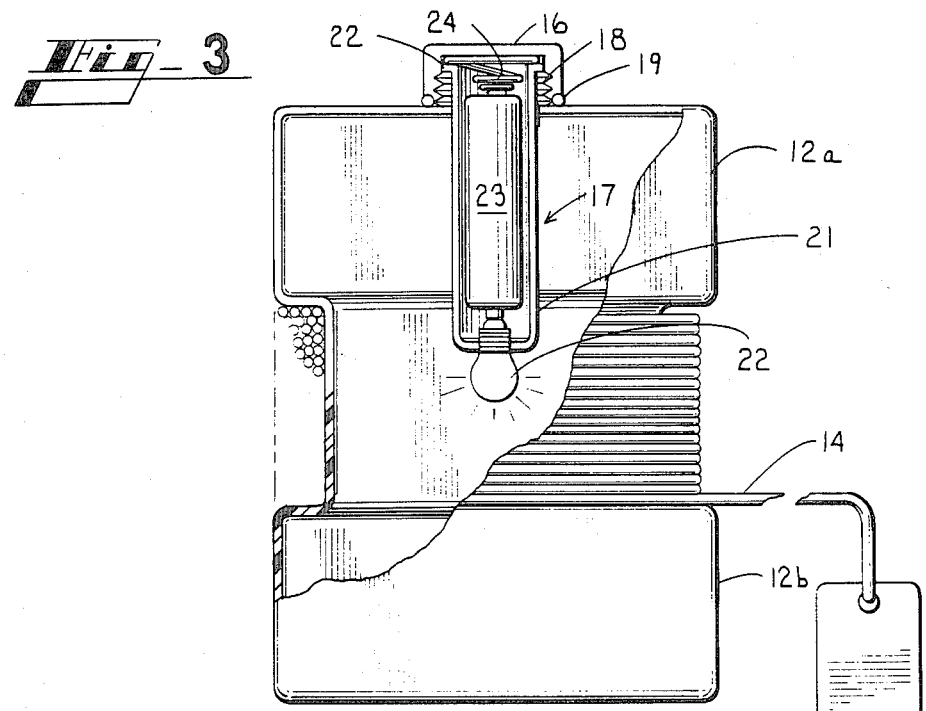
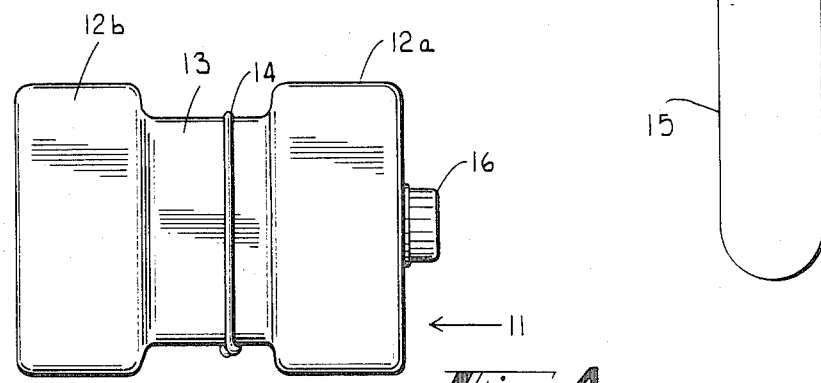
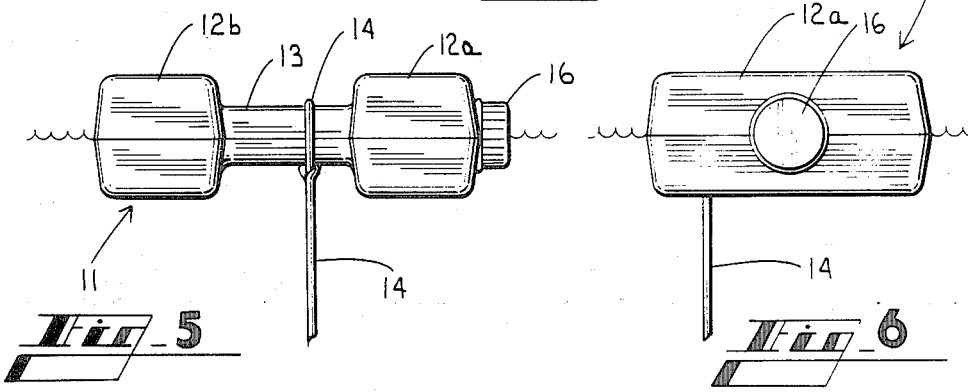

4,544,364

ILLUMINATED BUOY MARKER

BACKGROUND OF THE INVENTION

In the highly competitive fishing tournaments that are known today, a fisherperson has at his or her disposal many improved and sophisticated electronic devices which enable that person to locate likely fishing areas very precisely. Such likely areas are brushpiles, rocks, ledges and trees within the body of water which is being fished. Whether during the day or night, these likely areas must be marked with a buoy and fished precisely from all directions. The angler of the prior art has not had a proper marking device that could meet all of his needs. The marking devices currently available and those known in the prior art leave much to be desired. For instance, some buoys are in the shape of barbells, and these models have very small spindles around which the cord line is to be wrapped, which wastes valuable time on the angler's part in trying to retrieve the buoy and either letting the line out or retrieving the line upon the buoy. Generally, with such buoy markers, the buoy is a floating object of suitable size and shape with a line wrapped around it in some manner, and a weight attached to the free end of the line, which serves as an anchor. Once the angler decides on a place to fish, he will then put the buoy in the water, let the line release itself, and the weight will sink to the bottom of the water and rest upon the bottom surface. This then positions the buoy at the desired spot and it by and large maintains itself at that position.

Some buoy markers have a chamber which fills with water, and then the buoy rights itself to provide a visual target for the angler. Frequently this righting process is slow and delays the angler considerably. Also, once the buoy is retrieved out of the water, the drainage from the buoy is quite aggravating to the angler. In some of the tall buoys, which project out of the water a considerable distance in order to provide a better visual indication to the angler, there is a drifting problem caused by wind blowing or the current moving, which will move the buoy itself out of a proper fishing location, and this of course defeats the original purpose to begin with.

However, one of the biggest problems encountered by the angler is the problem of night fishing, whereas most of the prior art buoys, regardless of their design or shape, all but become useless after dark. In the past, some buoys have been coated with reflective surfaces to be seen when a bright light is shone against the buoy to locate it for the angler. However, this creates a substantial problem because a bright light shone around the water will spook the game fish which the angler seeks to maintain in the position where they have been located, and it also alerts competitors of the angler's fishing location. Also, shining a bright light in the dark will hamper the angler's night vision for several minutes and this causes the angler to lose directional contact with the buoy which the angler has just located with that bright light. Obviously, the shining of a light is not the most desirable practice for night fishing. If a buoy cannot be located at night, the angler will make many wasted casts to unproductive fishing locations. It is very important that the angler be able to see the marker buoy at all times and to be able to manuever his boat around the buoy and fish a particular location marked by the buoy from all directions without getting too close to the buoy or without spooking the fish. Obviously, when an angler has lost contact with or the location of the buoy, important time is wasted in trying to relocate the buoy and getting set up again to fish a particular location. In fact, this inventor has found that it is quite easy to lose buoys altogether at night, regardless of the system used with the prior art buoys.

There are known in the prior art, signalling devices which have lights contained therein. However, these lights are impractical to use as, or with, a fishing buoy because the lights are either too bright or to directionalized to be of proper effect for an angler in a competitive fishing situation.

Accordingly, it is a general object of the present invention is to provide an improved illuminated buoy for the angler.

More specifically, it is an object of the present invention to provide a marker buoy for an angler that when cast upon the water is self-illuminating with a soft light and will set itself to the water's bottom without malfunction.

Another object of this invention is to provide a fishing buoy that can be easily seen for limited distances from any angle at night regardless of how it is set in the water and regardless of any wave or wind action.

Yet another object of the invention is to provide an improved fishing buoy for a competitive angler that is simple to produce, easy to use, and inexpensive to manufacture.

Other objects advantages and capabilities of the invention will become apparent from the following description, summary of the invention, taken in conjunction with the accompanying drawings, showing only a preferred embodiment of the invention.

SUMMARY OF THE INVENTION

In the preferred form of the invention shown herein, a lighted fishing marker buoy is shown, having a suitable bifurcated body, which is made of suitable material to both float in the water and to be translucent to allow a light placed within the body to shine with a soft light visible from any direction to an angler.

Around the stem connecting the two enlarged portions of the bifurcated body is wound a line to the free end of which is attached a weight which will anchor the floating body to the bottom of the body of water and maintain the floating body in a stable position with respect to the anchor. It is anticipated that the body will have a suitable battery-operated light contained therein and the body will preferably be of a rectangular shape to resist turning moments and unwinding additional anchor line due to wind and wave motion.

BRIEF DESCRIPTION OF THE DRAWINGS

FIG. 3 is a top plan view of the invention, showing a partial breakaway of the internal structure of the invention and particularly showing a battery-operated light.

FIG. 4 is a bottom plan view of the invention.

FIG. 5 is a side elevation view of the invention, showing the invention floating in the water with the anchor line extended.

FIG. 6 is an end view of the invention floating in the water with the anchor line extended and showing especially the end of the invention which houses the battery-operated system.

DETAILED DESCRIPTION OF THE PREFERRED EMBODIMENT

Figure 2:
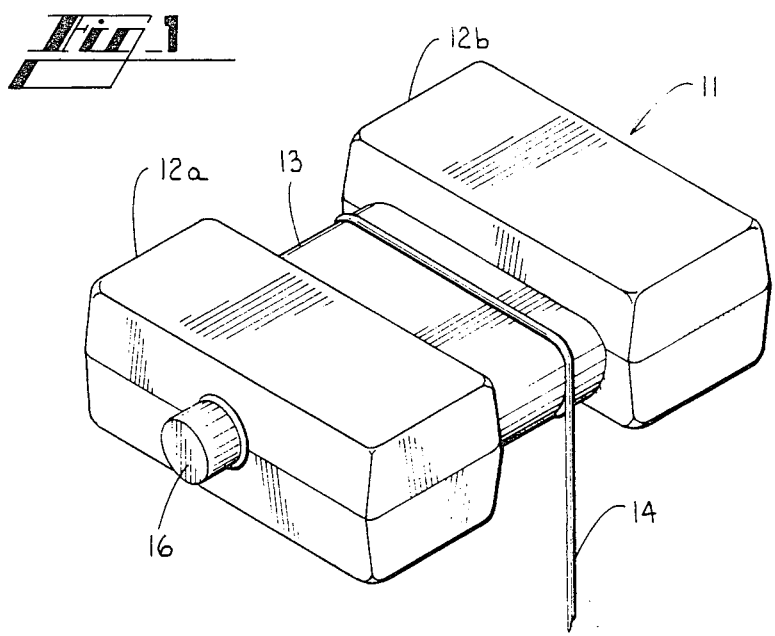
FIG. 2 is an overall perspective view of the invention, showing the anchor and a portion of the anchor line.
Figure 2:
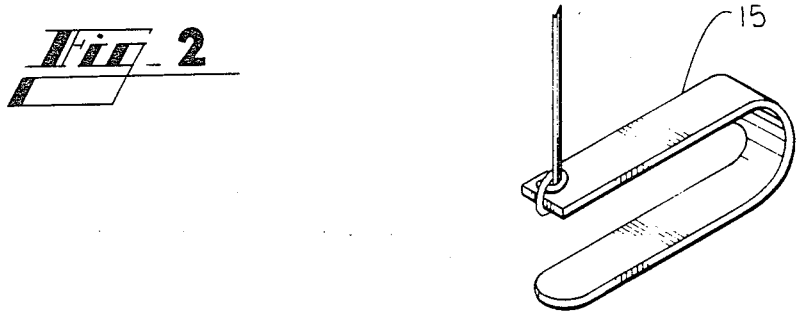

Referring now to the drawings wherein like numerals designate corresponding parts throughout the several figures, the marker buoy of the present invention is shown in the several figures generally by the numeral 11. The marker buoy is generally a bifurcated rectangular shaped hollow, floatable device having a reduced midsection or waist as is more particularly shown in FIG. 2. The buoy 11 generally has larger end sections 12(a) and 12(b) connected by the reduced waist 13. The purpose of the waist 13 is to allow the angler to wind there around a sufficient length of anchor cord 14 which is permanently attached to the buoy 11 at one end thereof and has at the other end thereof a suitably shaped and weighted anchor 15. As will be evident to one skilled in the art, the anchor should be of such a weight that the buoy will be maintained in a fixed position but yet of such a weight and size that is convenient to use by the angler.

Figure 1:
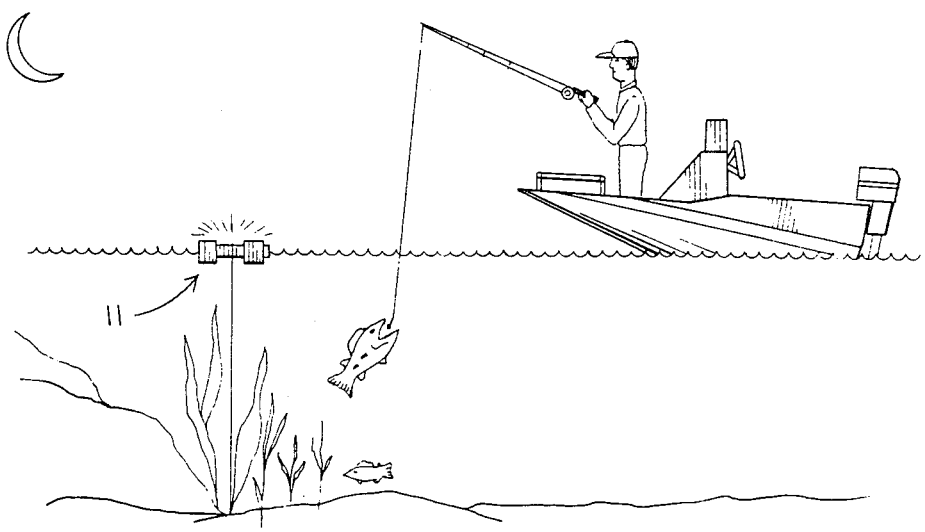
FIG. 1 is a stylized view of an angler fishing from a boat floating in a body of water utilizing the lighted floating marker buoy of the present invention anchored to the bottom of the body of water.

As can be readily seen in the figures, and especially FIG. 1, the rectangular shape of the marker buoy is quite distinctive yet it provides an important function of the present invention in that when the angler casts the marker buoy into the water the weight of the anchor 15 will cause the anchor cord 14 to unwind from around the waist 13 of the buoy until the line is played out to the depth of the water and the anchor rests upon the water's bottom. The dimensions of the buoy are such that the end sections 12(a) and 12(b) have enough flat surface engaging the water to resist a turning moment caused by wind or wave action. This resistance to turning will therefore maintain the marker buoy substantially over the anchor and maintain the buoy in the relationship with the fishing location that the angler desires.

As can be seen in FIG. 3, there is a protuberance from the end of end section 12(a) identified by numeral 16, which is a threaded cap for the lighting device 17. The lighting device 17 is so designed that it protrudes into the body of the marker buoy 11 so that the light itself is positioned substantially midway between the end sections 12(a) and 12(b). Such will provide the most effective illumination to illuminate the entire marker buoy in an even, soft light. As has been previously mentioned, the marker buoy is made of a translucent material so that the light therein will be able to be seen by the angler from any direction.

Looking to the lighting device 17 of FIG. 3, it is obvious that when manufactured the end section 12(a) will have integral therewith a threaded end 18 to which the cap 16 is affixed when the lighting device is inserted. It is contemplated that some water-proofing type device be provided to the lighting device to prevent water from entering into the hollow cavity of the marker buoy through the lighting device. Consequently, it is proposed that something akin to a rubber type O-ring be provided to the cap 16 which is identified by numeral 19. Therefore, when the cap would be secured tightly upon the threaded stud 18, the O-ring would be impressed against the body of the end section 12(a) providing a water-tight seal to the interior of the marker buoy.

The remaining portions of the lighting device 17 comprises a conductive body 21 which in effect will be an elongated, cylindrical tube having at one end thereof an outwardly shaped flange 22 which will cover the threaded stud 18 to maintain the conductive body in operative relation within the marker buoy. At the other end of the conductive body 21, there will be a threaded apperture into which is screwed or otherwise affixed a light bulb 22. To provide power to the light bulb 22, a suitable dry cell battery 23 is employed and the positive end thereof is in contact with the light 22 while the negative end thereof is in contact with a conductive battery engaging spring 24 located within the threaded cap 16.

In order to operate the illuminating device, the battery 23 would be inserted into the conductive body 21 and then the threaded cap 16 would be screwed upon the threaded stud 18 which would then the spring 24 with the conductive body 21 thereby completing the electrical circuit and illuminating the bulb. The angler would make sure that the threaded cap 16 is tightly secured to engage the O-ring 19 to prevent water from leaking into the hollow body of the marker buoy and at this point the buoy would then be operable and the angler would merely cast the buoy into the water over the desired location and the anchor weight 15 would then play out the anchor line 14 until the weight stops at the water's bottom. At this point, the buoy would be fully operational and could be seen by the angler and would be maintained in its desired location.

When the angler desires to retrieve the buoy, he merely pulls it from the water, loosens the threaded cap 16 to break the circuit of the light 22 and winds the anchor line 14 around the waist 13 of the marker buoy. Once the line is wound around the buoy, the pliable lead anchor 15 is wrapped around the line 14 to prevent an unintentional unwinding of the anchor line and to assist with storage of the buoy.

It should be understood that the just described embodiment merely illustrates principles of the invention and a selected preferred form. Many additions, deletions and other modifications may, of course, be made thereto without departing from the spirit and the scope of the invention as set forth in the following claims.

What is claimed is:

1. An improved self-setting illuminated buoy marker comprising:
    a hollow, translucent buoyant marker buoy having an elongated bifurcated body, said body including a central axis member connecting two end sections;
    an anchor line having one end thereof connected to said central axis member and capable of being wound there around, the other end of said line having an anchor member connected thereto;
    a lighting device mounted integrally within the hollow, buoyant body of said marker buoy, said lighting device producing diffused, low-intensity illumination through said translucent buoyant body, said lighting device comprising a light source;
    means associated with an outside wall of an end section and supporting said light source within the body;
    an opening formed in said outside wall for access to said lighting device within the buoy; and
    water-tight closing means selectably associated with said outside wall to close said opening and maintain said lighting device within said buoy, wherein said lighting device is selectably accessible through said opening in said outside wall, and wherein the produced illumination is visible from all directions whereby when in position over a selected fishing location the buoy is visible to the angler from any direction in daylight or darkness regardless of wind or wave conditions.

2. The marker buoy of claim 1, wherein the body comprises said elongated, bifurcated body including said central axis having proximal and distal ends, said elongated body terminating at the respective proximal and distal ends by substantially rectangularly shaped end sections, said proximal and distal end sections being connected by a hollow stem waist member, the anchor line being connected to the waist member.

3. The marker buoy of claim 2, wherein said end sections are of a substantially flat configuration with the thickness axis thereof being substantially less than the width axis thereof so as to maintain the buoy marker floating on a flat side to resist a turning moment applied to the buoyant marker by wave or wind action once the anchor member is placed upon the bottom of the body of water.

4. The marker buoy of claim 3, wherein the waist member has a substantially flat configuration, and wherein when the marker buoy is placed in the water the weight of the anchor member is sufficient to cause the anchor line to be discharged from the waist member and to cause rotation of the buoy marker until the anchor reaches the bottom surface of the water, at which time rotation will cease and the buoy marker will be maintained in a fixed position above the anchor.

5. The marker buoy of claim 1 wherein said closing means further comprises a cap threadably connected to said end section of said marker buoy and means for waterproofing said closing means.

6. The marker buoy of claim 5 wherein said closing means further comprises means to effect a closure of an electrical circuit between a battery and a light bulb so as to cause said light bulb to illuminate.

7. The marker buoy of claim 6 wherein said means to effect a closure of an electrical circuit comprises a conductive body in operative relation within said marker buoy, one end of said conductive body having said light bulb operatively attached, the other end of said conductive body located for selection engagement with said cap whereby said electrical circuit between said bulb and said battery is closed when said cap is threadably connected to said end section such that said closing means is waterproof.

8. An improved self-setting illuminated buoy marker comprising:
a hollow, translucent buoyant marker buoy having an elongated bifurcated body, said body including a central axis member connected two end sections, said end sections being rectangular in shape;
an anchor line having one end thereof connected to said central axis member and capable of being wound there around, the other end of said line having an anchor member connected thereto;
an opening formed in an outside wall of an end section;
a lighting device selectably inserted through said opening, said lighting device comprising a conductive body member, one end of said conductive body member extending into said marker buoy and having a light bulb attached thereto, the other end of said body member having an outwardly extending flange, said flange having a slightly wider diameter than said opening so that said flange rests against said outside wall so as to hold said conductive body member in place;
a cap threadably connected to said end section to close and waterproof said opening and provide access to said lighting device; and
means associated with said cap for engaging said conductive member and closing an electrical circuit including said lighting device when said end section is operatively engaged by said cap so that said electrical circuit is closed when said cap is threadably engaged to said end section so that said cap provides waterproof closing for said opening, whereby said bulb is lighted to produce diffused, low intensity illumination through said translucent buoyant body of said marker buoy, said illumination being visible from all directions when said buoy is in position over a selected fishing location.

* * * * *